United States Patent Office 3,425,814
Patented Feb. 4, 1969

3,425,814
STABILIZED OIL
William Judson Mattox, Baton Rouge, La., assignor to Esso Research and Engineering Company, a corporation of Delaware
No Drawing. Filed May 3, 1963, Ser. No. 277,724
U.S. Cl. 44—63                                    5 Claims
Int. Cl. C10l 1/18

This invention concerns an improved petroleum oil and more particularly relates to petroleum distillate oils stabilized against color degradation and sludge formation.

Petroleum distillate fuels, e.g. middle distillate fuels such as jet engine fuels and heating oils, contain unstable compounds which decompose and form sludge during storage. The formation of sludge is accompanied by a color degradation of the oil.

Good storage stability in middle distillate fuels is especially important because such fuels are often stored for extended periods. If fuels, especially cracked oils and their blends, are not stable in storage, they deteriorate in color and form gum, sludge or sediment which can be very troublesome. For example, in home heating oil this sludge can clog filters, pump screens, and burner nozzles causing the heating unit to become inoperative. In diesel fuels, sludge can cause poor engine operation by fouling filters and injectors and causing other difficulties in service. In many fuel systems, water condensed from the air in the storage tank or introduced by accident increases these difficulties because the gums agglomerate at oil water interfaces and form membranes of hydrated gum which readily clog fuel systems.

Various additives and processes have been suggested for overcoming the above-mentioned problem. For example, one suggestion was to treat a sludge-prone fuel with ethylene oxide in combination with aqueous sodium hydroxide. Fair results were obtained with this process. The process, however, was rather involved in that it required several mixing steps and separation of the caustic from the fuel.

It is, therefore, an object of this invention to provide a petroleum distillate fuel of improved stability.

It is another object of this invention to provide a simple and efficient method of stabilizing a petroleum distillate fuel.

Other objects will be found by reading the following description of the invention.

The objects of this invention are attained by dissolving a small amount of an oil-soluble epoxide into a potentially unstable distillate oil.

The present invention is applicable to petroleum distillate oils and is particularly applicable to petroleum distillate fuels boiling in the range of from about 300° F. to 900° F. Such fuels include heating oils, diesel fuels, jet engine fuels and the like.

The stabilizing additives of this invention are epoxides having a molecular weight of at least 58. Suitable epoxides are those having one or more three-member heterocyclic rings with each ring containing one oxygen atom and two carbon atoms. Such compounds are included by the following general formula:

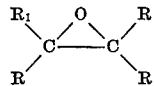

wherein $R_1$ is selected from the group consisting of alkyl groups containing from 1 to 5 carbon atoms, cycloalkyl groups, aryl groups, hydroxy groups and various derivatives of the aforementioned groups particularly derivatives containing oxy and/or oxo linkages. R is selected from the group consisting of $R_1$ and hydrogen.

A preferred class of epoxides includes alkylene oxides having 3 or more carbon atoms per molecule, substituted alkylene oxides, cycloalkylene oxides, epoxidized vegetable oils such as epoxidized soy bean oil and the like.

The epoxides of this invention are readily prepared from olefinic materials from established procedures so that suitable epoxides are available or can be prepared in a wide variety of boiling ranges and other physical properties such as molecular weight, per cent oxirane oxygen, and the like.

Olefin-containing oils may be stabilized by mildly epoxidizing the total oil or by epoxidizing a small portion of the oil to a higher level of oxirane oxygen and blending the portion with the total. A middle distillate fuel is stabilized by dissolving a small portion of an epoxide into the oil.

The oil-soluble epoxides are dissolved into an oil in an amount equivalent to 0.01 to 0.4 wt. percent or more oxirane oxygen, and preferably from 0.05 to 0.2 wt. percent oxirane oxygen.

As stated hereinbefore, it was suggested to use ethylene oxide in combination with a caustic to stabilize distillate oils. The following example was performed to demonstrate the results obtained by using ethylene oxide alone and in combination with a caustic.

Example 1

A light catalytic heating oil was contacted with gaseous ethylene oxide until approximately 1 wt. percent of the epoxide (0.36 wt. percent of oxirane oxygen) had been dissolved. A portion of the ethylene oxide-containing oil was separated for color stability tests while the remainder was washed with 10% NaOH and then with water before the color stability tests. The color stability or color-hold test consisted of saturating the oil with air followed by heating at 210° F. for 16 hours, Tag Robinson colors were determined on the heated and unheated samples. The following tabulation of data shows the effects of the epoxide additive alone and when used in combination with caustic washing.

TABLE I.—STABILIZATION OF HEATING OIL WITH ETHYLENE OXIDE 0.36 WT. PERCENT OXIRANE OXYGEN ADDED

| Sample | Color (Tag Robinson) | |
|---|---|---|
| | Initial | Color-hold |
| Oil feed, no additive | 16½ | 1½ |
| Oil+ethylene oxide | 16¼ | 5½ |
| Oil+C₂H₄O+aqueous NaOH | 14½ | 10 |

The oil feed suffered a high degree of color degradation. Ethylene oxide effected only a low degree of stabilization. The combination of ethylene oxide and sodium hydroxide satisfactorily stabilized the oil.

It will be seen from the following examples that the higher molecular weight epoxides of this invention are more effective used alone than is the combination of ethylene oxide and sodium hydroxide. Moreover, the use of the higher epoxide is more efficient in that it does not require separating a caustic from the treated oil.

Example 2

Light catalytic heating oil similar to that of Example 1 but freshly distilled and of lighter color was stabilized by the addition of 1 wt. percent of epoxidized soybean oil (0.1 wt. percent oxirane oxygen) with the following results.

TABLE II.—STABILIZATION OF HEATING OIL WITH EPOXIDIZED SOYBEAN OIL (0.1% OXIRANE OXYGEN)

| Sample | Color (Tag Robinson) | |
|---|---|---|
| | Initial | Color-hold |
| Oil feed, no additive | 21¼ | 1½ |
| Oil+epoxide | 20¼ | 17¼ |

In addition to being more effective than the combination of ethylene oxide and caustic, the epoxides of this invention are more effective when used alone than when used in combination with a caustic. This is shown by the following example.

Example 3

A freshly cracked, untreated, light catalytic heating oil of 29.8° API gravity and having a Tag Robinson color of 19½ was employed to evaluate the effectiveness of stabilization by epoxide addition as compared to the use of the same epoxide in combination with aqueous caustic. In each case, propylene oxide was added to the oil in an amount corresponding to 0.1 wt. percent oxirane oxygen. For the combination treatment, 26 g. of 10 wt. percent aqueous NaOH per 100 g. of oil was added with the epoxide. After agitation and settling, the caustic was separated and the oil water washed preceding color and color-hold tests. The following data were obtained and are shown in comparison with the untreated oil without additive.

TABLE III.—STABILIZATION OF HEATING OIL WITH PROPYLENE OXIDE 0.1 WT. PERCENT OXIRANE OXYGEN ADDED

| Sample | Color (Tag Robinson) | |
|---|---|---|
| | Initial | Color-hold |
| Oil feed, no treatment or additive | 19½ | 1 |
| Oil+$C_3H_6O$+aqueous NaOH | 20 | 9½ |
| Oil+propylene oxide | 20 | 12 |

These data show that the untreated oil without epoxide stabilization suffered a high degree of color degradation. The oil after treatment with propylene oxide and aqueous caustic showed a substantial improvement in stability but clearly was not as effective as the same quantity of epoxide employed as an additive.

Example 4

The effectiveness of a number of epoxides of various boiling points and oxirane oxygen content was evaluated as in Examples 1 and 2 using a freshly cracked, light heating oil. Summarized data from these evaluations as well as some physical property data for the various compounds are summarized in Table III. Each compound was added in such quantity as to give 0.1 wt. percent oxirane oxygen in oil. All the compounds evaluated were quite effective in stabilizing the color, the color-hold values ranging from 11¾ to 17¼ whereas that of the unstabilized feed was only 2½.

TABLE IV.—STABILIZATION OF HEATING OIL WITH EPOXIDES 0.1 WT. PERCENT OXIRANE OXYGEN ADDED

| Epoxy additive | | | | | Color (Tag Robinson) | |
|---|---|---|---|---|---|---|
| Compound | Formula | Mol. wt. | B.P., °F. | Percent oxirane oxygen | Initial | Color-hold |
| Oil feed, no additive | | | | 0 | 19 | 2½ |
| Propylene oxide | $C_3H_6O$ | 58 | 93 | 27.6 | 18½ | 13¾ |
| Butylene oxide | $C_4H_8O$ | 72 | 145 | 22.2 | 19½ | 14 |
| 2,3-epoxy-1-cyclopentanol | $C_5H_8O_2$ | 100 | | 16.0 | 18¾ | 13¾ |
| 1,2-epoxy-3-isopropoxypropane | $\overline{OCH_2C}HCH_2OCH(CH_3)_2$ | 116 | 310 | 13.8 | 18½ | 11¾ |
| 1,2-epoxyethylbenzene | $\overline{OCH_2C}HC_6H_5$ | 120 | 381 | 13.3 | 19¼ | 13½ |
| 1,2-epoxy-3-phenoxypropane | $\overline{OCH_2C}HCH_2OC_6H_5$ | 150 | | 10.7 | 18¾ | 12¾ |
| α-Pinene oxide | $C_{10}H_{16}O$ | 152 | | 10.5 | 19½ | 16¼ |
| Dipentene dioxide | $C_{10}H_{16}O_2$ | 168 | 468 | 19.0 | 19 | 15½ |
| Drapex 6.8 [1] | | | | 6.8 | 20 | 16¾ |
| Epoxol 9-5 [2] | $C_{57}H_{98}O_{12}$ | 974 | | 9.5 | 19½ | 16 |
| Oxiron Resin, 2001 [3] | | | | 11.0 | 19½ | 17¼ |

[1] Epoxidized Soybean oil; Argus Chemical Corp. [2] Epoxidized soybean oil; Swift and Co. [3] Resinous epoxides; Food Machinery and Chemical Corp.

The data in Table II and Table IV demonstrate the efficacy of the instant invention. As is seen by comparing the data in Table II and Table IV with that in Table I and Table III, the epoxides of this invention are more effective than either the ethylene oxide used alone or in combination with a caustic, and more effective used alone than in combination with a caustic.

In summary, the use of epoxides such as propylene oxide and the like yields better results and obviates the need for the caustic.

What is claimed is:

1. A stabilized distillate fuel oil consisting essentially of a major proportion of a petroleum distillate oil boiling at from 300° F. to 900° F. and a minor amount sufficient to inhibit color degradation of said oil of an epoxide selected from the class of compounds represented by the structural formula

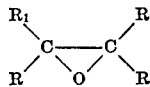

wherein $R_1$ is selected from the group consisting of alkyl groups containing from 1 to 5 carbon atoms, cycloalkyl groups, aryl groups and hydroxy groups, and R is selected from the group consisting of $R_1$ and hydrogen.

2. An oil according to claim 1 wherein said epoxide has been added to said oil in an amount equivalent to 0.01 to 0.4 wt. percent of oxirane oxygen.

3. An oil according to claim 1 wherein said epoxide is propylene oxide.

4. An oil according to claim 1 wherein said epoxide is epoxidized soybean oil.

5. An oil according to claim 1 wherein said epoxide is pinene dioxide.

References Cited

UNITED STATES PATENTS

| 2,496,508 | 2/1950 | Watson | 252—407 X |
| 2,665,254 | 1/1954 | Coppock | 252—52 |
| 2,734,032 | 2/1956 | Coppock | 252—52 |
| 2,948,669 | 8/1960 | Remes | 252—52 X |

DANIEL E. WYMAN, *Primary Examiner.*

Y. H. SMITH, *Assistant Examiner.*

U.S. Cl. X.R.

252—407